May 19, 1931. C. G. MACK 1,805,950
AWNING
Filed Sept. 9, 1929
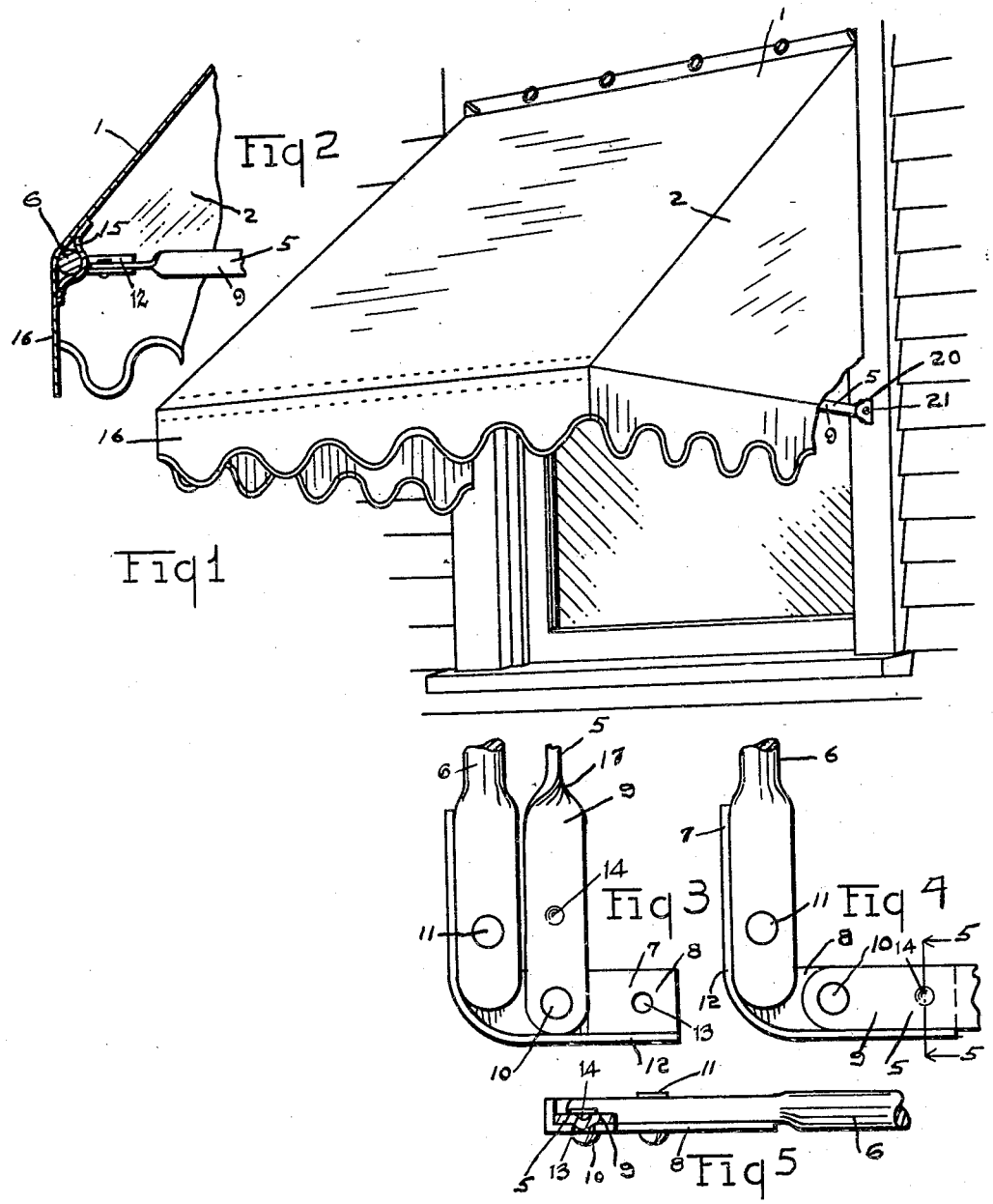
Inventor
Clarence G. Mack
By Faust F. Crampton
Attorney Patented May 19, 1931

1,805,950

UNITED STATES PATENT OFFICE

CLARENCE G. MACK, OF TOLEDO, OHIO, ASSIGNOR TO HETTRICK MANUFACTURING COMPANY, OF TOLEDO, OHIO

AWNING

Application filed September 9, 1929. Serial No. 391,118.

My invention has for its object to provide an awning that is particularly adapted for packing and shipping and subsequent mounting. It provides a foldable awning frame and means whereby the canvas or flexible sheet material of the awning may be rolled about parts of the frame and the awning packed in cartons or boxes for shipping.

The invention may be contained in awnings that vary in their details of construction and, to illustrate a practical application of the invention, I have selected an awning containing the invention as an example of the various awnings that embody the invention, and shall describe the particular awning selected hereinafter. The awning referred to is shown in the accompanying drawings.

Fig. 1 is a perspective view of the awning, a part being shown broken away for purposes of illustration. Fig. 2 is a view of a section through a part of the awning. Fig. 3 illustrates the means whereby the side bars of the awning are connected to the cross-bar and shows portions of the parts in their relatively folded positions. Fig. 4 is a view similar to that of Fig. 3 and shows the parts in their relatively open positions. Fig. 5 is a view of a section taken on the plane of the line 5—5 indicated in Fig. 4.

In the form of construction shown in Figs. 1 to 5, the awning is formed of a sheet material part, such as canvas, and a frame for maintaining the canvas at the desired slope or inclination commonly found in awnings. The canvas may be provided with a top only or it may be provided with a top part 1 which is connected to the triangular side portions 2. The frame 5 is formed of a cross bar 6 which has end parts 7 that extend at right angles to the body of the cross bar. The end parts 7 have flattened surfaces 8 that are located substantially in the plane of the body of the cross bar 6. The parts 7 form pivot supporting members for the side bars 9. The side bars 9 are preferably pivoted to the parts 7 at points close to the ends of the cross bar, as at 10. The flattened surfaces 8 being located substantially in the plane of the body of the cross bar 6 limits the pivotal movements of the side bars substantially to the plane of the body of the cross bar. In order to prevent lateral play of the awning when it is mounted, the cross bar is connected to the side bars by knife-blade joints, so as to permit folding of the side bars towards the cross bar but to prevent outward movement of the side bars relative to the cross bar beyond a predetermined angular relation as between the cross bar and the side bars.

In the form of construction shown in Figs. 1 to 5, the parts 8 are secured to the ends of the cross bar 6 by means of the rivets 11. The parts 8 are formed of sheet metal and have portions extending at right angles to each other. Each of the parts 8 have a flange 12 that is formed along the outer side edges of the said right angularly extending portions. The flange, formed along the side edges of each of the parts 8, is located in contact with each end portion of the cross bar and in close proximity to the end edges of the side bars. Preferably, the edges of the side bars are rounded to permit pivotal movement of the side bars towards the cross bar. The flange thus permits free movement of the side bars towards the cross bar, but limits the movements of the side bars relative to the cross bars to a 90° angular movement away from the cross bar, and thus the flanges 12 of the parts 8 operate to prevent any side sway or free movement of the awning when it has been mounted.

In order to provide for locking the frame into position, when mounted, an opening 13 is formed in the angular part 8 and a point depression 14 is made in the flat part 9 of the side bar 9, so located as to engage and to nest with the opening 13 when the side bar is at its greatest angular position away from the cross bar.

In order to securely connect the awning to the frame, a band 15 is sewed along the juncture between the top part and the flap 16, and the cross bar 6 is inserted between the band and the top part 1 of the awning and is thus enclosed therein while the side parts 2 of the awning are located on the outside of the side bars and are free therefrom. Thus, in packing the awning, the side bars may be readily folded towards the cross bar, and the side parts 2 may be folded inwardly, preferably, to the under side of the top part 1, and then the sheet material of the awning may be rolled about the cross bar and the folded side bars.

Preferably, the cross bar is formed of a rounded metal bar while the side bars are formed of flat metal, the edges of the bodies of the side bars being located in vertical planes. Since the cross bar is provided with end parts having plane surfaces located substantially in the plane of the body of the cross bar, the side bars are provided with twisted end portions 17, in order to locate the body of each of the side bars in a plane at right angles to the plane of the surface of the said end parts of the cross bar. By locating the body portions of each of the side bars in vertical planes, the frame is greatly strengthened in a vertical direction, and, moreover, it affords a means for more readily connecting the frame to the building by means of a bracket for a swinging movement in a vertical plane. Thus, the frame may be supported by means of the brackets 20 and the pins 21 that extend through the openings formed in the ends of the side bars 9.

I claim:

1. In an awning frame, a crossbar, a pair of side bars having plane surfaces located substantially in the plane of the axis of the crossbar, pivotal members extending through the plane surfaces for pivotally connecting the side bars to the ends of the crossbar, the crossbar having flanged parts for engaging the side edges of the plane surfaces of the side bar to limit the outward movement of the side bars relative to the crossbar to substantially a 90° angle.

2. In an awning frame, a crossbar having flattened end portions, a pair of side bars having flattened end portions, a pivotal member interconnecting the flattened end portions of the crossbar with the flattened end portion of the side bars, a flange member extending above and along the sides of the flattened end portions of the crossbar and the flattened end portions of the side bars to limit the outward movement of the side bars relative to the crossbar substantially to a 90° angle.

3. In an awning frame, a crossbar, a pair of side bars, the crossbar having flattened end portions, a pair of L-shaped flange members having a crater located on one leg of the member, the L-shaped flange members pivotally connected to the flattened end portions of the crossbar, the side bars having flattened end portions, the flattened end portions of the side bars having a protruding nub and being pivotally connected to the L-shaped flange member to cause the protruding nub to rest within the crater in the L-shaped flange member when the side bar is located relative to the crossbar at substantially a 90° angle.

4. In combination with an awning frame, a crossbar having end portions, the end portions having plane surfaces, a pair of side bars having end portions, the end portions of the side bars having plane surfaces, an interconnecting member having plane surfaces and flanged edges, a pivotal member locating the plane surfaces of the crossbar on the plane surfaces of the interconnecting member, a second pivotal member locating the plane surfaces of the side bar on the plane surfaces of the interconnecting member to permit movement of the side bars relative to the crossbar to substantially a 90° angle.

In witness whereof I have hereunto signed my name to this specification.

CLARENCE G. MACK.